United States Patent [19]

Brackett et al.

[11] Patent Number: 4,817,324

[45] Date of Patent: * Apr. 4, 1989

[54] PALMING GRIP FISHING ROD AND REEL ASSEMBLY

[75] Inventors: John E. Brackett, Minneapolis; Larry J. Dahlberg, Brainerd, both of Minn.

[73] Assignee: Fishing Designs, Inc., Minneapolis, Minn.

[*] Notice: The portion of the term of this patent subsequent to Oct. 6, 2004 has been disclaimed.

[21] Appl. No.: 104,093

[22] Filed: Oct. 5, 1987

Related U.S. Application Data

[63] Continuation-in-part of Ser. No. 946,823, Dec. 29, 1986, Pat. No. 4,697,376, which is a continuation-in-part of Ser. No. 842,309, Mar. 21, 1986, Pat. No. 4,631,853, which is a continuation-in-part of Ser. No. 610,609, May 15, 1984, Pat. No. 4,577,432.

[51] Int. Cl.⁴ .............................................. A01K 87/00
[52] U.S. Cl. .......................................... 43/23; 43/18.1
[58] Field of Search ...................... 43/20, 22, 23, 18.1; 242/84.1 R, 211, 212, 213, 214, 215, 216, 217, 218, 219, 220, 221

[56] References Cited

U.S. PATENT DOCUMENTS

| | | | |
|---|---|---|---|
| 1,398,721 | 11/1921 | Higbee | 43/20 |
| 1,472,684 | 10/1923 | Schmid | 43/20 |
| 2,190,786 | 2/1940 | Henze | 43/20 |
| 4,130,251 | 12/1978 | Findley | 242/84.1 R |
| 4,577,432 | 3/1986 | Brackett et al. | 43/23 |
| 4,631,853 | 12/1986 | Brackett et al. | 43/23 |
| 4,697,376 | 10/1987 | Brackett et al. | 43/23 |

Primary Examiner—M. Jordan
Attorney, Agent, or Firm—Moore & Hansen

[57] ABSTRACT

A fishing rod and handle assembly with a laterally offset foregrip and/or butt grip provided on the handle to enhance palming grip comfort and mechanical advantage in resisting leveraged upward rod forces acting on the handle. An inclined surface on the palming side of the foregrip, butt grip, or both, permits firmer gripping of the handle and reel in a palming grip position. The reel may also be laterally offset with respect to its rod attachment foot and with respect to the rod to further improve palming grip comfort and control.

29 Claims, 6 Drawing Sheets

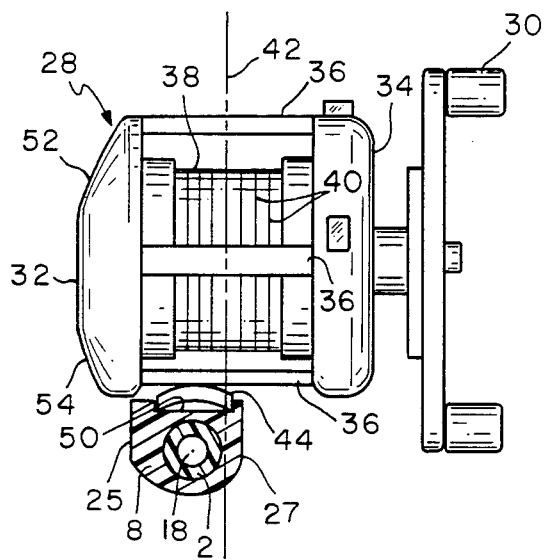
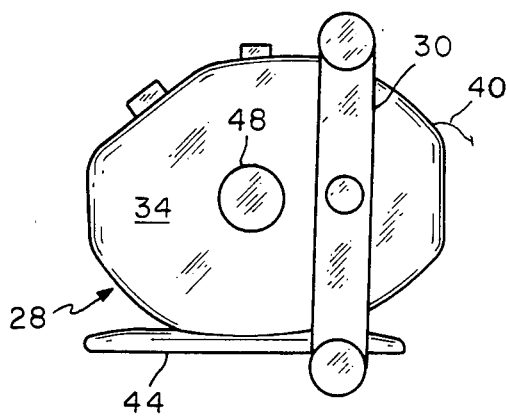
FIG. 3
FIG. 5
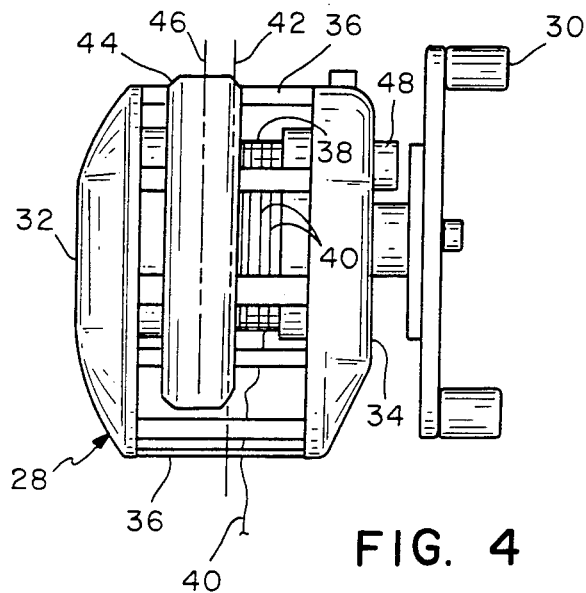
FIG. 4

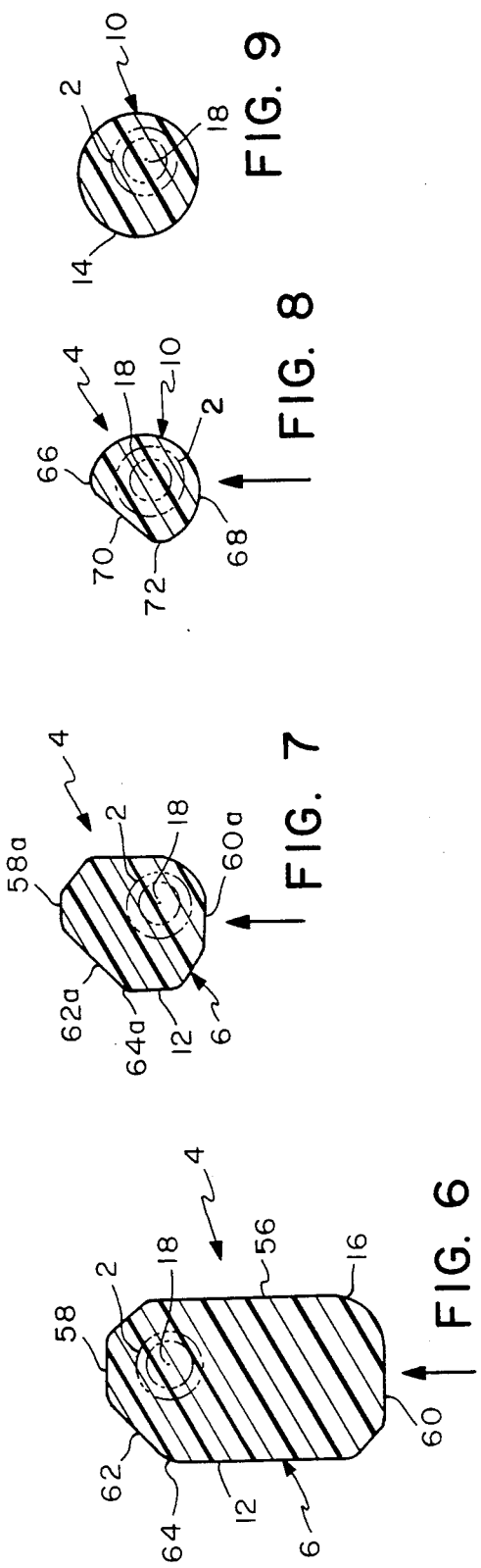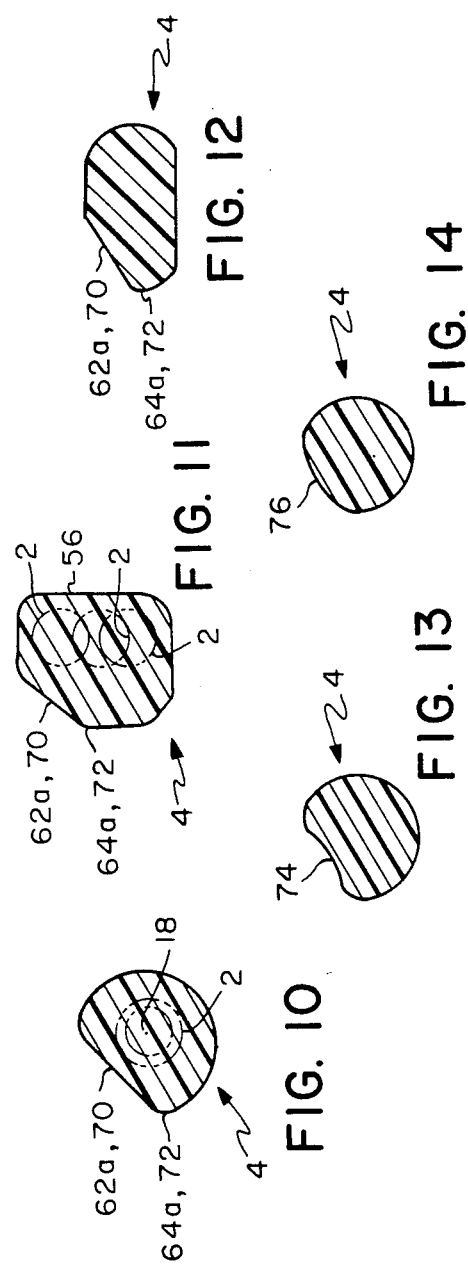

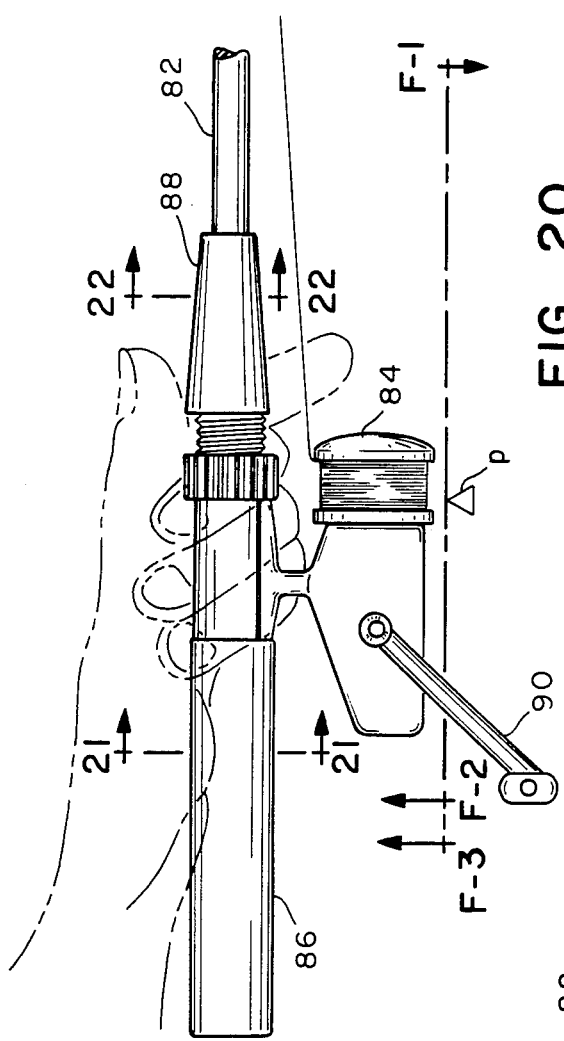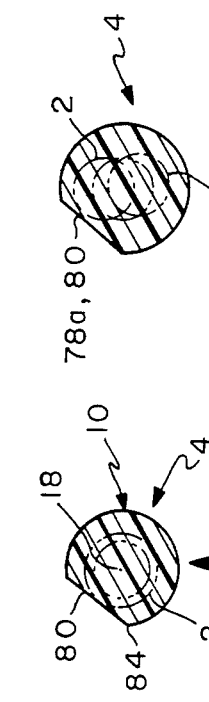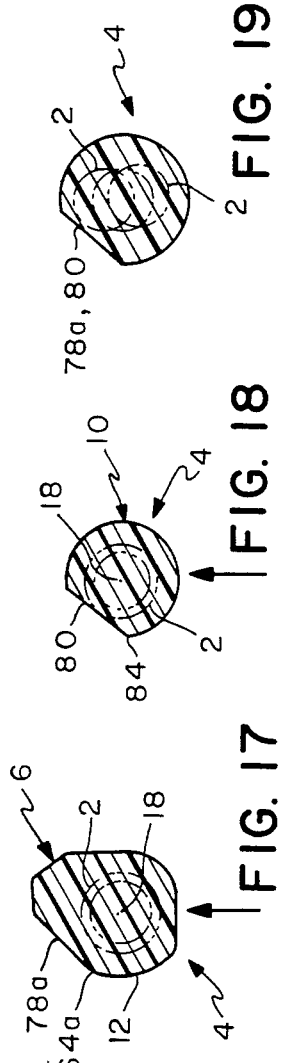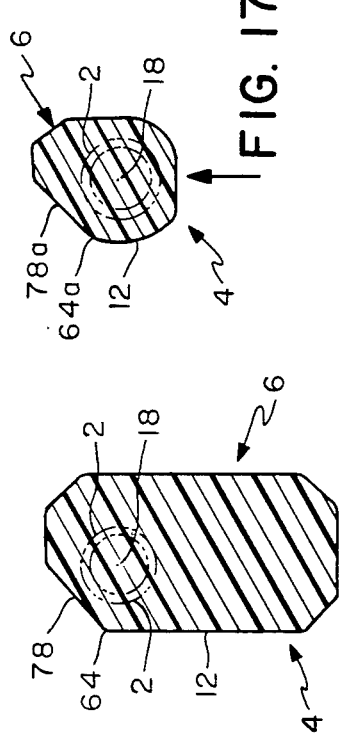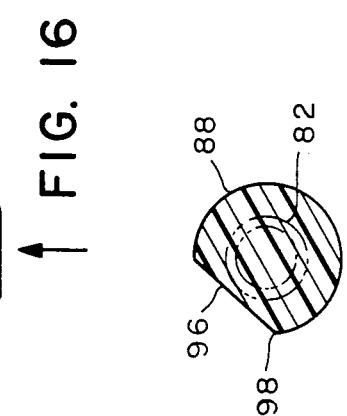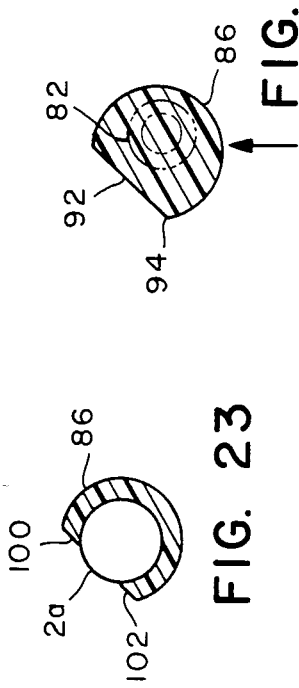

PALMING GRIP FISHING ROD AND REEL ASSEMBLY

BACKGROUND OF THE INVENTION

This application is a continuation-in-part of application Ser. No. 946,823, filed on Dec. 29, 1986, issued as U.S. Pat. No. 4,697,376. That application is a continuation-in-part of application Ser. No. 842,309, filed Mar. 21, 1986, now U.S. Pat. No. 4,631,853, issued on Dec. 30, 1986, which is a continuation-in-part of application Ser. No. 610,609, filed Mar. 15, 1984, now U.S. Pat. No. 4,577,432, issued on Mar. 25, 1986.

The aforesaid copending application, Ser. No. 946,823, discloses a fishing rod and handle assembly and a fishing rod, handle, and reel assembly wherein the butt grip is laterally offset towards the palming side of the reel. The laterally offset butt grip improves user grip comfort and mechanical advantage by reducing the lateral grip distance from the palming side of the reel to the butt grip when the fisherman's palming hand grips the reel and the butt grip. More of the user's hand is positioned on the top of the butt grip, which improves the fisherman's ability to engage, resist, and control leveraged upward rod forces acting on the butt grip.

Such upward rod forces are the result of downward forces on the rod tip caused by fish and lure action acting through a lever arm extending from a pivot point in the area of the reel seat outwardly along the rod to the rod tip.

The copending application also discloses a canted butt grip cross section utilizing a topward, inclined plane which creates a hand grip crease edge or corner on the palming side of the butt grip. This feature comfortably places more of the user's hand grip on top of the butt grip against the upward force resistant inclined plane and thus better resists leveraged upward rod forces. The copending application specifies these improvements for casting rods, spinning rods, and rod and reel assemblies.

The handle construction and the reel construction disclosed herein is directed to improving the ability of the user to effectively hold the handle and the handle and reel in such a way as to counter and resist forward and downward pulling forces on the front end of the rod when using a casting rod, spinning rod, or casting reel.

An essential function of a fishing rod and reel is to permit the user to hold, engage, and resist in a controlled manner, forward and downward pulling forces on the front end of the rod. A fishing rod is an elongated lever. The user holds the rear end of the fishing rod and the user's hand grip creates the pivot point of the lever causing the fishing rod forces to be leveraged into the fisherman's hand grip. Fishing rod leveraged forces can be subtle, sensitive forces such as when a fish lightly touches the fisherman's bait or strong forces such as when the fisherman sets the hook into a fish.

The palming grip problem is that a fisherman must engage leveraged rod forces while simultaneously gripping both the fishing rod handle and the reel, such as when he simultaneously holds the reel and the butt grip or the reel and the foregrip.

An additional palming grip problem is that on all gripped fishing rods, maximum leveraged rod forces are exerted on the rear palm and little finger area of the user's hand on the palming side of the butt grip, which is the side of the fishing rod handle opposite from the crank of a reel mounted on the fishing rod. Fishermen commonly hold the rod with one hand and operate the crank of the reel with the other hand; and the rod-holding hand is more in contact with the palming side of the handle, which is the side opposite from the reel's crank. Because fishing rod forces are leveraged into the user's hand, the rear of the user's hand grip receives maximum rod forces on the palming side of the gripped handle.

The current commercial fishing rod state of the art is focused on improving the strength, lightness, and sensitivity of fishing rods. New rod shaft constructions such as linear graphite and new handle materials such as E.V.A. do not address the basic grip leverage problems that exist when the fisherman grabs hold of the fishing rod and reel.

Two current commercial fishing rod products address the problem of fishermen's grip leverage: Fenwick has designed a casting handle which is simply larger in the butt grip area behind the reel and one other company has introduced a rod with a second foregrip positioned closer to the tip of the rod which shortens the length of the fishing rod lever. Neither of these products address the problem of excessive lateral palming grip distance and neither of these fishing rod designs employ any particular handle cross section for improving user grip mechanical advantage against leveraged rod forces.

The palming grip problem of excessive lateral grip distance occurs when the user simultaneously grips both the handle and the reel, because casting reels are considerably wider than fishing rod handles. State of the art casting reels have addressed palming grip problems with smaller and lighter reels having a smoothly contoured palming side of the reel opposite the crank side of the reel. These reels designed to accommodate user palming grip are commonly referred to as palming reels. Palming style reels are attached to the fishing rod's reel seat with a reel base attachment shaft which is assembled to the bottom of the reel and is centered to the spool of the reel. No current commercial palming style reels employ any reel to rod assembly construction which addresses the palming grip problem of excessive lateral palming hand grip distances.

The fishing rod and reel assembly disclosed herein has been specifically contoured and constructed to meet the fisherman's need for an improved palming grip when simultaneously holding the reel and the handle and to meet the fisherman's need for improved mechanical advantage to resist leveraged upward rod forces on the palming side of the handle.

BRIEF SUMMARY OF THE INVENTION

The primary objective of this invention is to make fishing rod, handle, and reel assemblies physically easier to use, more comfortable, and easier to effectively grasp, retain, and control when fishing.

A particular objective is to provide a fishing rod handle and a fishing reel so structured and contoured as to permit the user's hand to more closely conform to and engage the surface of the handle and reel, and thus to grasp the handle and the reel more firmly and comfortably when gripping the reel and the butt grip or the reel and the foregrip with a palming hand grip.

A further object is to reduce lateral gripping distances on the handle and the reel in such a way as to place more of the user's gripping hand on the top of the handle and the reel with resultant mechanical advantages. Specifically, this allows the fisherman to more efficiently counter leveraged upward rod forces acting on the gripping area of the handle and the reel when using the palming grip on part of the reel and part of the handle with bait casting and spin casting rod and reel assemblies. Mechanical advantages are also realized on spinning rods.

A still further objective is to improve the sensitivity to rod vibrations and pulses by placing more of the user's hand in close proximity to the rod shaft on rod and handle constructions having the rod shaft extend at least part way into the butt grip segment of the handle.

An additional objective is to improve the fisherman's hand grip mechanical advantage and hand grip contact to the handle where the rear of the fisherman's hand contacts the palming side of the handle and encounters maximum leveraged rod forces.

Yet another object of this invention is to provide a casting reel which reduces user lateral palming grip distances and to provide a rod, handle, and reel assembly which advantageously accommodates multiple user hand grip positions.

These objectives can be realized on fishing rod assemblies employing either right or left hand cranking reels and can be realized on different fishing rod constructions such as blank thru constructions having the rod shaft extend into the butt grip, fat butt constructions where the rod shaft expands to a larger diameter and partially forms the reel seat segment, and on assemblies where the rod shaft is suitably connected to the forward portion of the handle.

In a preferred embodiment of this invention the foregrip and the butt grip are laterally offset towards the palming side of the reel, which reduces user lateral grip distances when the user simultaneously grips the reel and the foregrip or the reel and the butt grip. The reduction in lateral grip distance places more of the user's hand on top of the foregrip and butt grip, thus providing improved comfort and improved mechanical advantage in resisting and engaging upward leveraged rod forces transmitted into the user's hand from the top of the foregrip, reel, or butt grip.

As a further advantageous feature, a reel construction and mounting arrangement is utilized in which the reel is laterally offset towards the reel crank side of the reel, thereby reducing lateral palming grip distances. The lateral offset of the reel is achieved by laterally offsetting the reel foot attachment bar from the line spool of the reel in a direction towards the palming side of the reel. This laterally positions the reel spool and the reel body at an offset location in a direction towards the reel's crank. The laterally offset reel reduces lateral palming grip distances from the palming side of the reel to the foregrip and from the palming side of the reel to the butt grip, which places more of the user's hand grip on top of the assembly for increased mechanical advantage against leveraged upward rod forces.

Maximum lateral grip distance reduction and mechanical advantage is achieved by combining a laterally offset reel with a laterally offset butt grip and a laterally offset foregrip.

Another feature of the preferred embodiment is an upward force resistant handle cross section which provides the rear of the user's palm great upward force resistance against leveraged rod forces on the palming side of the handle where maximum leveraged upward rod forces act against the user's hand. The upward force resistant cross section utilizes an inclined plane on the top side of the butt grip which tapers downwardly towards the palming side of the handle and creates a tapered protrusion which snugly and comfortably projects into the user's hand, particularly the rear of the user's palm. The rear of the user's palm comfortably rests against the top of the inclined plane, providing great mechanical advantage for resisting leveraged upward rod forces. The tapered handle cross section can be utilized on both laterally offset handles and laterally centered handles as well as on both casting and spinning rods.

The preferred embodiment also employs a butt grip which is advantageously laterally contoured for both user palming grip and user casting rip by being laterally narrow at the front and laterally wider at the rear. The smaller front of the butt grip is more comfortable for the user's palming grip little fingers and the larger rear of the butt grip is more mechanically advantageous for the user's casting grip.

Another embodiment of the invention incorporates an exposed rod shaft on the upward force resistant taper which improves the user's ability to utilize the sensitivity characteristics of the rod shaft.

These and other objects and advantages of the invention will be readily understood as the following description is read in conjunction with the accompanying drawings wherein like reference numerals have been utilized to designate like elements throughout the several views.

BRIEF DESCRIPTION OF THE DRAWINGS

FIG. 3 is an end view of the reel of FIG. 1 and a vertical section view through the handle, taken along lines 3—3 of FIG. 1;

FIG. 4 is a bottom view of the reel of FIG. 3;

FIG. 5 is a side elevation view of the reel of FIG. 3;

FIG. 6 is a vertical section view through the handle, taken along lines 6—6 of FIG. 1;

FIG. 7 is a vertical section view through the handle, taken along lines 7—7 of FIG. 1;

FIG. 8 is a vertical section view through the foregrip portion of the handle, taken along lines 8—8 of FIG. 1;

FIG. 9 is a vertical section view through the handle taken along lines 8—8 of FIG. 1 and showing an alternative embodiment of the handle cross section;

FIG. 10 is a vertical section view through the handle showing an alternative embodiment of the handle cross section at any one of the locations indicated by section lines 6—6, 7—7, and 8—8 of FIG. 1;

FIG. 11 is a vertical section view through the handle taken along lines 7—7 of FIG. 1 and showing an alternative embodiment of the handle cross section at that location;

FIGS. 12-14 are vertical section views through the handle showing alternative embodiments of the handle cross section at the locations of section lines 6—6, 7—7, and 8—8 of FIG. 1;

FIG. 16 is a vertical section view through the handle, taken along lines 16—16 of FIG. 15;

FIG. 17 is a vertical section view through the handle, taken along lines 17—17 of FIG. 15;

FIG. 18 is a vertical section view through the handle, taken along lines 18—18 of FIG. 15;

FIG. 19 is a vertical section view through the handle showing an alternative embodiment of the handle cross section at the location of section lines 16—16, 17—17, and 18—18 of FIG. 15;

FIG. 20 is a side elevation view of a spinning rod and handle assembly, with the spinning reel in place, and illustrating diagrammatically the leveraged forces acting on a fishing rod and handle;

FIG. 21 is a vertical section view through the handle, taken along lines 21—21 of FIG. 20;

FIG. 22 is a vertical section view through the foregrip portion of the handle taken along lines 22—22 of FIG. 20; and FIG. 23 is a vertical section view through the handle showing an alternative embodiment of the handle cross section at various locations on the rod, one of which would be at the location of lines 21—21 on FIG. 20.

DESCRIPTION OF THE PREFERRED EMBODIMENTS

Figure 1:
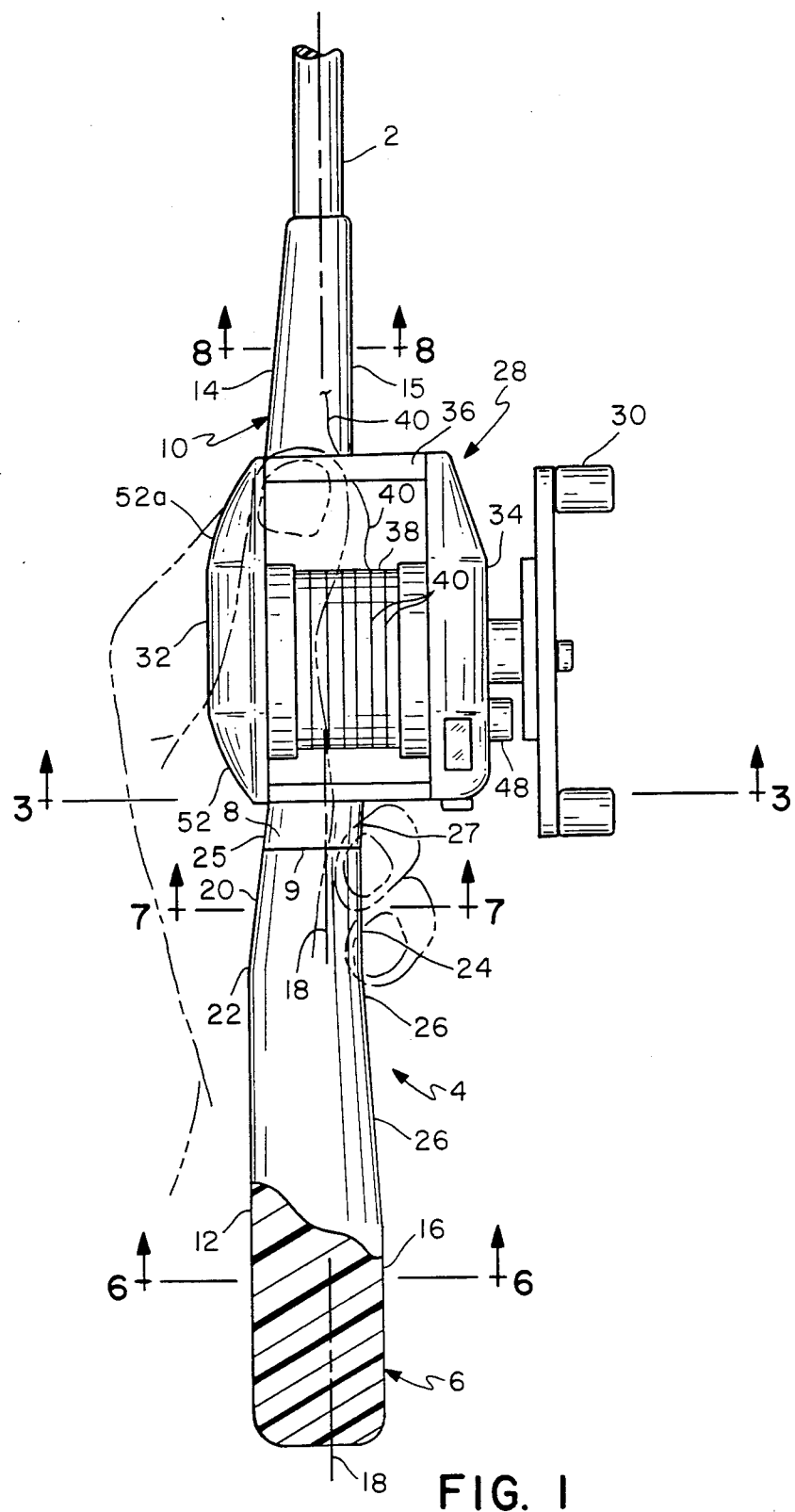
FIG. 1 is a top plan view, partially in section, showing a preferred embodiment of the improved fishing rod handle and reel assembly of this invention with a user palming hand grip holding the assembly.
Figure 2:
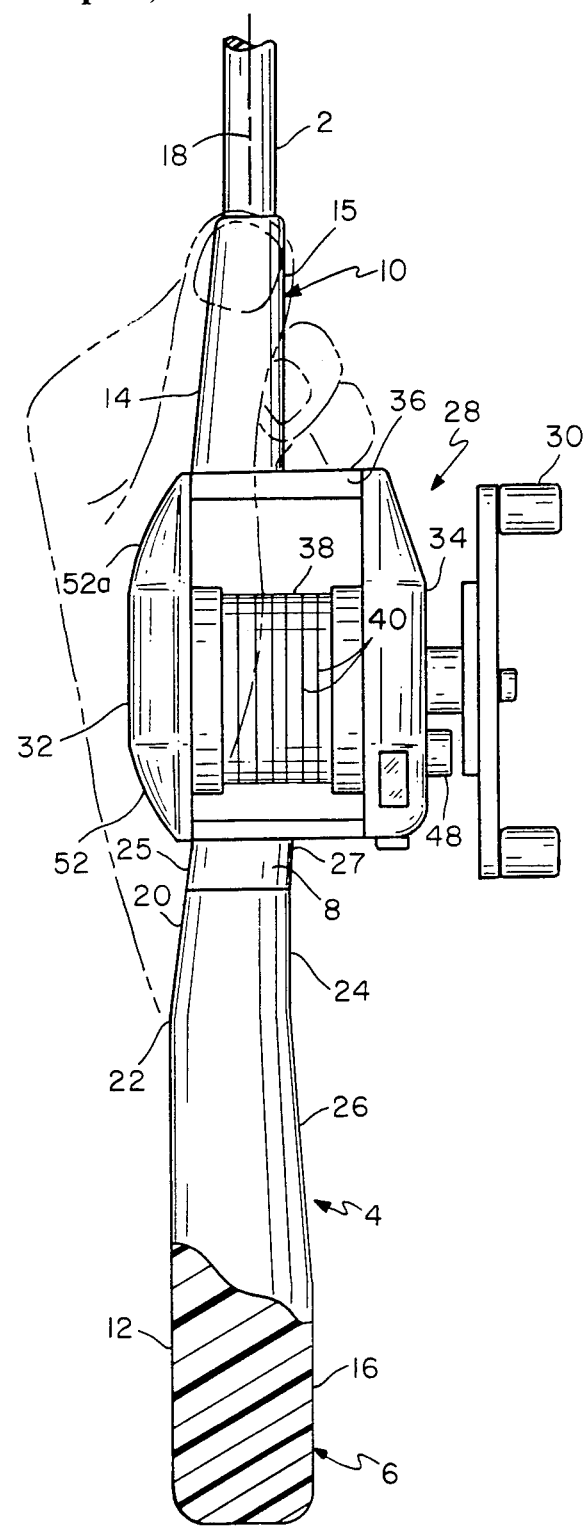
FIG. 2 is a top plan view of the assembly of FIG. 1 with a different user palming hand grip holding the assembly.

Referring now to the drawings, there is shown in FIGS. 1-5 a preferred embodiment of the improved fishing rod and reel assembly of this invention. The rod and handle assembly shown in FIGS. 1 and 2 is of the casting rod type, which is adapted to have either a bait casting reel or a spin casting reel mounted on a reel seat on top of the rod or rod handle. Bait casting reels are those having an open spool which the user must thumb when casting. Spin casting reels are fully enclosed and normally include a button or other actuator which the user must manipulate with his thumb to release the line when casting.

As shown in FIG. 1, the fishing rod and handle assembly is comprised of a rod shaft 2, and a handle generally indicated by reference numeral 4. The handle is comprised of a butt grip segment 6 and a reel seat segment 8 positioned forwardly of the butt grip. The forward end of the butt grip segment 6 and the rear end of the reel seat segment 8 merge along a juncture line 9 as shown in FIG. 1. A foregrip 10 is also shown on the rod shaft forwardly of the reel which is generally indicated by reference numeral 28. Various known materials may be used for the rod shaft and the handle. The rod may be made of graphite, metal, or plastic material with the appropriate physical qualities of strength and flexibility. The handle may be molded from plastic material, or formed from cork, rubber, or wood. In the preferred embodiment, the rod blank or shaft would be made of graphite, the reel seat 8 would be formed from molded plastic material, and the butt grip segment 6 would be molded as a single component from rubber or plastic. In FIGS. 1 and 2, the butt grip segment 6 is shown as being formed from plastic material. Foregrip 10 would normally be made of the same material as the butt grip segment. As shown in FIGS. 1-11, the rod and handle assembly 15 of the blank-through type wherein the rod blank or shaft 2 extends all of the way through the reel seat segment 8, and longitudinally within butt grip segment 6. Such a handle and rod shaft assembly provides a particularly strong, lightweight, and sensitive fishing rod structure. It is to be noted, however, that for purposes of the particular advantages of the rod and reel assembly disclosed herein, the handle and rod assembly need not be of such a blank-through construction. The rod shaft 2 may connect to the front end of foregrip 10 in a conventional manner by way of a ferrule or other suitable connection. Alternatively, the rod may be of the so-called fat butt construction wherein the rod shaft or blank tapers rearwardly in an outward direction to become wider and actually forms all or part of the reel seat segment and the handle.

With reference to FIG. 1, butt grip segment 6 has a palming grip side 12, and foregrip 10 has a palming grip side 14. The casting grip side of the butt grip is indicated by reference numeral 16. The rod shaft or blank 2 has a central, longitudinal axis 18. Butt grip segment 6 is formed so as to be laterally offset from rod shaft central axis 18 towards its palming grip side 12. Such lateral offsetness may be accomplished in various ways. As shown in FIG. 1, this is accomplished by having the butt grip segment 6 laterally offset over substantially its entire length with respect to rod shaft axis 18. The palming grip side 12 of butt grip segment 16 is substantially straight along its rear portion, and tapers inwardly at its forward end along an inclined side wall 20 towards the juncture line 9 with the rear end of reel seat segment 8. Reference numeral 22 indicates the point of maximum lateral offset towards the forward end of butt grip segment 6.

Butt grip 6 is particularly constructed and contoured to advantageously accommodate palming grip and casting grip utilization. This is accomplished by making the butt grip segment 6 relatively narrow at its forward end between inclined side wall 20 and opposite side wall 24 in the area of juncture line 9 with reel seat segment 8. The rear end of butt grip segment 6 between the side walls 12 and 16 is substantially wider, as is clearly shown in FIG. 1. The right, casting grip side 16 of butt grip segment 6 is formed to extend substantially straight in a direction generally parallel to and in alignment with rod shaft axis 18. This has the benefit of orienting the rear of the user's hand straight forward, in general alignment with the rod shaft 2. As a result, casting grip leverage and efficiency are advantageously increased, and straight casts along the line desired are assured when gripping butt grip segment 4 with the right hand for casting, with a right hand cranking reel as shown in FIGS. 1-5.

To further assist in lessening gripping distances in the palming position, and to enhance comfort and mechanical advantages by making the front or forward end of butt grip segment 6 relatively narrow between side walls 20 and 24, the forward side wall 26 on the casting grip side of butt grip segment 6 tapers or angles inwardly to the point where it merges with relatively straight side wall 24.

In order to accommodate a palming grip in a particularly advantageous way, the foregrip 10 is also totally offset towards its palming grip side 14. This is indicated and clearly shown in FIG. 1 by the laterally offset base or rear portion of foregrip 10 in the area directly in front of reel 28. The palming grip side 14 of foregrip 10 tapers or angles rearwardly and outwardly towards reel 28. This permits a relatively smooth merging of the palming grip side 14 of foregrip 10 with palming grip side wall 32 of reel 28. The opposite wall 15 of foregrip 10 is straight as shown. By virtue of this construction, the palming grip distances for the fingers of the user are reduced over the entire length of foregrip 10. This benefit is illustrated in FIG. 2 wherein the user's hand is shown in phantom lines in a forward palming grip wherein the user's thumb and at least two forefingers engage and wrap around foregrip 10. It may be noted with respect to FIG. 2 that the inside of the user's left hand is in contact with the palming grip side 32 of reel 28 as well as the palming grip side 14 of foregrip 10 because of the taper of side wall 14 rearwardly towards outwardly projecting palming grip side 32 of the reel.

The rod, handle, and reel assembly of FIG. 2 is identical to that shown and described with respect to FIG. 1. FIG. 2 simply illustrates a forward palming grip, in comparison with the more rearward palming grip illustrated in phantom lines on FIG. 1.

Referring again to FIG. 1, it will be seen that a complimentary, mating lateral offset is formed on the rear end of reel seat segment 8 by side walls 25 and 27 which angle rearwardly and laterally to the palming grip side 12 of butt grip segment 6. Side walls 25 and 27 thus merge along junction line 9 with the forward end extremities of side walls 20 and 24 of butt grip segment 6.

Reel 28 is constructed and arranged in an assembly with reel seat 8 as is best shown in FIGS. 1-5. A hand crank 30 is provided on one side of reel 28 as shown. For conventional, right hand cranking reels, crank 30 will be mounted as shown on the right side of reel 28, as viewed in FIGS. 1, 3, and 4. Reel 28 has a body comprised of a palming grip side plate 32 and a reel crank side plate 34 which are interconnected by a plurality of rigid cross members 36. Positioned within this frame or body is a reel spool 38 on which fishing line 40 is wound. Reel 28 has a central axis 42 as shown. Secured to the bottom of reel 28 is a reel foot attachment bar 44 having a longitudinal central axis 46 as shown.

Reel 28 is of the so-called palming grip type which has been flattened to provided a lower profile as shown in FIG. 5. Such a palming grip reel is also beveled on its palming grip side wall 32 along smoothly curved surfaces 52 and 52a at the top side thereof, as well as along the bottom side 54 as shown in FIGS. 1-4. Such curved or beveled surfaces provide a smoothly contoured palming grip side wall 32 against which the user's hand may securely and comfortably conform as illustrated in FIGS. 1 and 2. The oil cap 48 on such a reel, as shown in FIGS. 1, 2, 4, and 5 is on the crank side of the reel in order to avoid interference with the palming grip.

Reel seat 8, as shown in FIG. 3, has a recess 50 in its top surface within which reel foot attachment bar 44 is received. Attachment bar 44 is secured in place in a conventional manner by having its rear end slip under a recess or hood at the rearmost end of reel seat 8, with its forward end secured under an adjustable lock nut. With respect to FIGS. 3 and 4, it is to be noted that reel foot attachment bar 44 is laterally offset to the left towards palming grip side plate 32 of reel 28. Thus, the center line 46 of reel foot 44 is positioned laterally to one side of reel spool centerline 42, towards palming grip side plate 32, as shown. This is in contrast with conventional reel constructions wherein the reel foot or reel mounting bar is centered under the reel spool. By virtue of this arrangement, the entire reel 28 is laterally offset to the right as viewed in FIGS. 3 and 4, towards reel crank 30. The rod shaft or blank 2 is shown in FIG. 3 as extending within reel seat 8. In such a construction, the central axis 42 of reel spool 38 is laterally offset from rod shaft axis 18 in a direction towards reel crank 30. Reel foot attachment bar 44 is centered over rod shaft 2 as shown.

The above-described reel construction wherein the entire reel 28 is laterally offset towards its crank handle 30 with respect to its reel foot attachment bar 44 provides particular advantages for the palming grip user. The three basic user fishing rod assembly hand grips are palming grip on the reel and butt grip, palming grip on the reel and foregrip, and casting grip on the reel and the butt grip. All three gripping positions are improved by the fishing rod and reel assembly disclosed herein. Fishermen commonly cast with one hand gripping the butt grip and the reel. The thumb of the user's casting hand rests on the line spool of the reel and the user's four fingers curl around and grasp the butt grip area of the handle. The rear part of the user's casting hand holds the weight of the rod and engages most of the rod forces encountered in the act of casting a bait with a fishing rod. The user's casting grip thumb controls the release of the line 40 from a reel spool 38 by resting against and thumbing the line spool.

When the cast is completed and the bait lands on the water, most fishermen switch from a casting hand grip (conventionally the right hand) to a palming hand grip (normally the left hand). Their casting hand grip moves from holding the butt grip and reel to holding and operating the reel crank 30 for winding in the line and retrieving and presenting the lure to fish. The fisherman's opposite hand assumes a palming grip position by holding either the reel and the butt grip or the reel and the foregrip. When holding the reel and butt grip, the user's palm rests against the palming side plate 32 of the reel 28, and one, two, or three of the user's fingers curl around and grasp the forward end of the butt grip behind the reel 28. When the user holds the reel and the foregrip 10, his palm rests against the palming side 32 of the reel, with one, two, three, or four of his fingers curled around and grasping the foregrip 10 forwardly of the reel.

The palming grip problem is that reels are considerably wider than butt grips and foregrips, and the act of simultaneously gripping the reel and butt grip or the reel and foregrip creates an excessively wide lateral gripping distance for the palming hand grip of the user. This excessive lateral grip distance is uncomfortable and fatiguing for the user's hand, and the poor grip contact to the handle causes the handle to slip out of the user's grip.

An additional palming grip problem is that a fishing rod is an elongated lever, the pivot point of the lever being created by a forward part of the fisherman's hand grip, with the result that fishing rod forces are leveraged into the fisherman's hand. When fishermen use a palming grip holding and bearing against the palming side of the reel and the fishing rod handle, most of the user's hand grip is in contact with the palming side of the butt grip or foregrip, which is the same side of the handle on which the palming side of the reel is located. Downward forces on the rod tip caused by casting, lure retrieval, and the striking of a fish, cause reaction forces acting upwardly on the rod and handle in the area gripped by a fisherman in the palming position. Maximum fishing rod forces act through the handle into the fisherman's hand grip on the palming side of the butt grip and foregrip. Because fishing rod forces are leveraged, they are severe forces when exerted into and on the fisherman's hand grip; and the fishing rod handle has a strong tendency to slip out of the user's palming hand grip.

The laterally offset butt grip, laterally offset foregrip, and laterally offset reel as described above, overcome the aforesaid gripping distance and upward force problems in an effective way, by offsetting the reel 28 towards the crank side. The opposite or palming grip side of the reel does not protrude as far into the area where the user's palm must be positioned. Thus, the lateral gripping distances for grasping the entire assembly of the butt grip, reel, and foregrip are substantially reduced. Moreover, the reduction in lateral gripping distances permits the user to position more of his hand on top of the butt grip, reel, and foregrip. As a result, the hand is better positioned on top of the entire assembly to resist the aforesaid upward forces acting on the rod and handle.

It is to be noted that a left hand cranking reel, rather than a right hand cranking reel, as shown in FIGS. 1, 3, and 4 could of course be utilized on the rod and handle structures disclosed herein. With such a left hand cranking reel, the lateral offsets for the foregrip segment 10 and the butt grip segment 6 would be reversed from that shown in FIG. 1, with the palming grip sides 14 and 12 of the foregrip and butt grip being on the opposite side of handle 4 from that shown in FIG. 1.

The butt grip construction of the assembly of FIG. 1 is shown in the section views of FIGS. 6 and 7. As indicated in FIG. 6, the rearward portion of the butt grip 6 is offset downwardly below the longitudinal central axis 18 of rod shaft 2. FIG. 7 shows the forward portion of the butt grip 6 offset upwardly from the rod shaft. This would be the case on a butt grip which angles downwardly in a rearward direction in a pistol grip type of configuration.

It is to be noted that the butt grip 6 can be of the so-called blank-through construction wherein the rod shaft 2 extends all of the way through the reel seat segment 8 and at least partially into the butt grip segment 6. Alternatively, the rod shaft can be attached by any suitable means to the forward end of the handle 4 at the front end of foregrip segment 10.

As shown in FIGS. 6 and 7, butt grip segment 6 is laterally offset from rod shaft 2 in a direction towards the palming side 12 of the handle 4. FIGS. 6 and 7, together with FIG. 1, show the rearward end of the butt grip segment 6 in the area of flat, casting grip side wall 56 to be substantially wider in a lateral direction than the forward end of the butt grip segment between side walls 20 and 24. On all gripped fishing rods, the user's hand grip creates the pivot point of the fishing rod lever, and fishing rod forces are leveraged upwardly within the user's hand grip with maximum forces acting upon the rear of the user's hand, as indicated by the directional force arrows in FIGS. 6 and 7. When the user's casting hand grips a pistol grip type of butt grip his fingers curl around and grasp the rear area of the butt grip. The rearward end of the butt grip is laterally wider than the forward butt grip so as to give the user's casting hand grip appropriate casting mechanical advantage. When the fisherman employs a palming grip by holding the reel and the forward butt grip as shown in FIG. 1, the little finger and adjacent smaller fingers of the hand curl around and grasp the forward end of the butt grip segment. Thus, the laterally narrower butt grip at the forward end permits the user's fingers to curl farther and more completely around the butt grip and to better control and restrain it. The combination of a laterally wider butt grip at its rear end in the area of flat casting side 56 and a laterally narrower forward butt grip segment between butt grip side walls 20 and 24 results in improved comfort and mechanical advantage for both user casting grip and user palming grip.

The flat side wall 56 on the casting grip side 16 of butt grip segment 6 aligns the user's casting grip in a straight line with respect to the rod shaft axis 2. This produces more accurate casting and has the added benefit of giving the user's casting hand grip contact with a flat side wall. This is particularly advantageous when the user rotates his wrist and fishing rod over in a counterclockwise manner when casting.

An essential problem with respect to all gripped fishing rods is that maximum leverage rod forces exert themselves into and against the user's hand on the palming side 12, 14 (FIG. 1) of the handle 4. This is because the leverage forces exert at a maximum on the rear of the user's hand and palm, with the rear portion of palm of the user's hand extending farther rearwardly on the handle than any other part of his grip. This problem is accented in the application of a palming grip wherein the user simultaneously grips part of the laterally protruding reel and part of the butt grip and/or foregrip as illustrated in FIGS. 1 and 2. More of the user's hand is in contact with the palming side 12, 14 of the handle when utilizing such a grip.

In order to permit the fisherman to better counter the upward forces acting on the butt grip as illustrated in FIGS. 6 and 7, the butt grip segment 6 is provided with an inclined surface along the palming side 12 thereof. In FIG. 6 the inclined surface is indicated by reference numeral 62, and the continuation of that surface at the location of the section view of FIG. 7 is indicated by reference numeral 62a. Inclined surface 62, 62a slopes downwardly from the top face 58, 58a of butt grip segment 6 and outwardly towards the palming grip side 12 of the butt grip segment. Those inclined surfaces merge along their lower edges with the palming side wall 12 of butt grip segment 6 to create a lateral protrusion 64, 64a. That protrusion projects into and bears snuggly against the palming hand of the user when grasping the handle with a palming grip. As a result, a relatively large part of the user's palm, which is subjected to the maximum upward leverage rod forces, rests firmly against the inclined surface 62, 62a to provide great resistance to the upward forces and particular mechanical advantage.

User hand grip comfort is also improved, particularly with a palming hand grip on the foregrip 10 as illustrated with respect to FIGS. 1, 2, and 8. The vertical cross section view of FIG. 8 through the foregrip 10 shows an inclined surface 70 which is shaped similarly to that of the inclined surfaces 62, 62a on the butt grip segment 6. Thus, inclined palming grip surface 70 slopes downwardly and outwardly from the top wall 66 of the foregrip to a lower edge where it merges in a lateral protrusion 72 with the bottom wall 68 of the foregrip. The user's hand grip comfort is increased and palming grip containment of the handle is improved on both the foregrip and the butt grip because as is illustrated with respect to FIGS. 6-8, the butt grip and foregrip cross section is diagonally and circumferentially smaller with the inclined surface than on conventional butt grips and foregrips.

The location of the pivot point for the rod, and thus the location nd extent of upward forces acting on the butt grip and foregrip will vary depending upon the location of the user's hand in the palming grip position. Thus, the farther forward the user's hand is positioned, including gripping engagement with the foregrip as shown in FIG. 2, the farther forward will be the rod pivot point. The downward forces acting on the tip or front end of a fishing rod due to the reaction force of a lure and to the resistance of a fish, and the resultant forces acting upwardly on the rod handle are illustrated with force lines with respect to a spinning rod and reel assembly in FIG. 20.

The inclined surface providing the palming grip advantages set forth above can be utilized on butt grips and foregrips having various cross sectional configurations, including grips of circular cross section as shown in FIGS. 8 and 9. The foregrip of FIGS. and 8 is shown to be offset upwardly from the longitudinal axis 18 of rod shaft 2. Also, as is shown in FIGS. 8 and 9, the foregrip 10 is offset laterally towards the palming grip side 14 of the foregrip segment.

The foregrip segment 10 illustrated with respect to FIG. 9 is circular with no inclined surface and is an alternate foregrip for the handle of FIG. 1 showing that a laterally offset foregrip reduces lateral gripping distances from the palming side 32 of the reel 28 to the foregrip.

FIGS. 10 through 14 show alternative cross sectional configurations for both the butt grip segment 6 and the foregrip segment 10. In FIG. 10, the handle cross section on which the inclined surface 62a, 70 is formed is essentially circular. This construction can be advantageously employed on longer butt grip rods commonly used for two-hand casting, and has the added benefit of ease of manufacture in that the entire butt grip can be symmetrically constructed.

In FIG. 11, which has the flat casting grip side wall 56 on a butt grip configuration, alternate vertical locations for the rod shaft 2 are shown within the butt grip segment. All configurations provide a lateral protrusion 64a, 72 where the inclined butt grip surface 62a, 70 merges with the lower side of the palming grip side wall 12 or 14 of the handle 4.

FIGS. 13 and 14 illustrate butt grip segments or foregrip segments of circular configuration wherein the inclined surface may be of curvilinear shape rather than in the shape of a straight, inclined plane. Thus, in FIG. 13 the inclined palming grip surface 74 is concave, and in FIG. 14 that surface 76 is shown as being convex to fit snuggly into the palm of the user's hand.

Figure 15:
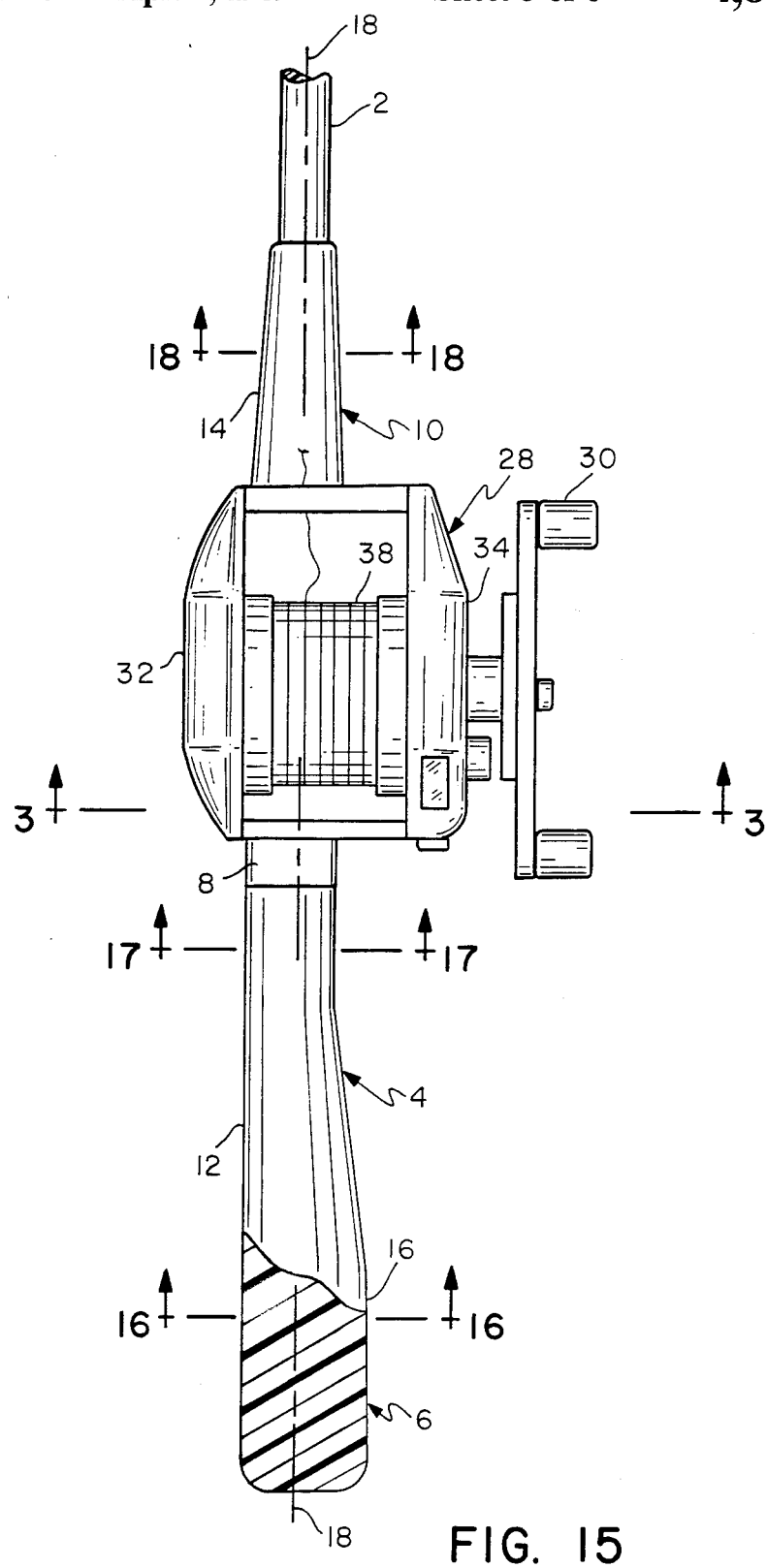
FIG. 15 is a top plan view, partially in section, of another embodiment of the improved fishing rod handle and reel assembly of this invention.

FIG. 15 illustrates another fishing rod handle and reel assembly embodiment of this invention. The foregrip segment 10 and the forward end of the butt grip segment 6 are laterally centered to the rod shaft axis in this embodiment. The rear end of the butt grip segment 6 is laterally offset towards the crank 30 of reel 28. The reel is of the same construction and mounting arrangement as shown with respect to FIGS. 1 through 5, and is laterally offset towards the crank side of the reel, away from the palming grip side 12, 14 of the handle 4. The laterally offset reel, when combined with a laterally centered foregrip and a laterally centered forward butt grip with respect to the rod shaft axis 18 reduces user lateral palming grip distances from the reel to the foregrip and from the reel to the forward butt grip. This arrangement also comfortably places more of the user's palming hand on top of the butt grip and foregrip to advantageously engage and resist upward rod forces.

FIGS. 16 through 19 are vertical section views taken through the handle of FIG. 15 at the locations shown thereon. FIGS. 16 and 17, in combination with FIG. 15 indicate a rearwardly inclined, pistol grip style of butt grip 6. Thus, as indicated in FIG. 17, the forward end of the butt grip is offset upwardly above the longitudinal central axis 18 of rod shaft 2; and, as indicated in FIG. 16, the rearward end of butt grip segment 6 is offset downwardly below the central axis 18 of the rod shaft. The inclined surface 78, 78a on the palming grip side 12 of the butt grip segment 6 is similar to that shown in FIGS. 6 and 7 and functions in the same way to permit the user to comfortably position more of the palm of his hand on top of the butt grip to better resist upward acting rod forces. The lateral protrusion which creases the user's palm and fits comfortably therein is indicated by reference numerals 64 and 64a in FIGS. 16 and 17.

FIG. 18 shows a vertical cross section of the foregrip 10 of FIG. 15 which substantially conforms to the foregrip cross section shown in FIG. 8 with respect to FIG. 1. Thus, the foregrip 10 of FIG. 15 has an inclined surface 80 terminating along its lower edge in a lateral protrusion 84 where it merges with the bottom wall of the foregrip. As may be noted with respect to FIG. 18, the foregrip 10 is laterally centered on the rod shaft 2 in the embodiment of FIG. 15.

FIG. 19 is an alternate, cross sectional embodiment of either the foregrip 10, or the butt grip 6 of FIG. 15, at either the forward or rear end of the butt grip as indicated by the location of section lines 16—16 and 17—17. As is indicated in FIG. 19, the entire handle 4 can be offset upwardly, centered or offset downwardly with respect to rod shaft 2. As is also true of the handle configurations illustrated in the section views of FIGS. 6-8, the bottom end of the rod handle 4 is wider laterally than is the top portion thereof. Such a handle construction further assists in permitting the user to further extend his hand and fingers around the handle when utilizing the palming grip.

FIG. 20 illustrates in a side elevation view a spinning rod 82 and reel and handle assembly which can also beneficially incorporate the inclined handle surface for better gripping action as described above with respect to bait casting rod and reel assemblies. The spinning rod is indicated by reference numeral 82, and extends rearwardly through a butt grip segment 86 and a foregrip segment 88. The spinning reel 84 is provided with a hand crank 90. FIG. 20 illustrates diagrammatically how leveraged forces act downwardly at F-1 on the forward end of the rod, about a pivot point location P created by the gripping action of the user's hand on the rod handle. As a result, forces F-2 and F-3 act upwardly on the rod handle as illustrated. As is illustrated in FIG. 21, the butt grip segment 86 may be of circular cross section and incorporate an inclined surface 92 terminating at its lower end in a lateral protrusion 94 which fits snuggly into the palm of the hand of the user. Inclined surface 92 and protrusion 94 permit the user to firmly engage more of the upper surface on one side of the butt grip segment 86 so as to better resist the upward rod forces. The same is true of the inclined surface 96 provided on foregrip segment 88 of the spinning rod assembly, as illustrated in the vertical section view 22 taken through the foregrip.

FIG. 23 is a cross sectional view illustrating an alternative shape and construction at various locations on the handle of the spinning rod of FIG. 20. The inclined surface formed on the handle is cut away to provide spaced apart inclined surfaces 100, 102 with an upper portion 2a of the rod shaft exposed therebetween. The exposed rod shaft provides greater user grip sensitivity to vibrations and pulsations in the rod 82.

Although the improved fishing rod and reel assembly and features disclosed herein have been set forth with respect to particular embodiments thereof, it is anticipated that various changes and modifications may be made in the size, shape, construction, and arrangement of the various components without departing from the spirit and scope of the invention as defined by the following claims.

What is claimed is:

1. A fishing rod and handle assembly comprising:
a rod shaft having a longitudinal, central axis;
an elongated handle secured to said rod shaft;
a reel seat segment on said handle having a reel seat thereon;
a foregrip segment on the front end of said handle forward of said reel seat segment and a rear portion of said foregrip segment extending rearwardly over at least one-half the length thereof being continuously laterally offset from the longitudinal, central axis of said rod shaft towards the opposite side of said reel seat segment from that on which the crank of a reel mounted on said reel seat segment will be located, and said laterally offset portion of said foregrip comprising the palming grip said thereof and
an upward force-resistance cross section along at least a portion of said foregrip segment as viewed along a vertical cross sectional plane extending generally perpendicular to said rod shaft axis with said rod shaft oriented horizontally, said upward force resistant cross section comprising an inclined surface formed on the top of said foregrip segment by cutting away a portion of the top of said foregrip on the laterally offset, palming grip side thereof, said inclined surface sloping generally downwardly and outwardly towards said palming grip side of said foregrip, whereby a relatively large part of the user's palm and fingers may be positioned on top of said inclined surface to effectively resist leveraged upward rod forces acting on said foregrip.

2. A fishing rod and handle assembly as defined in claim 1 wherein:
substantially the entire length of said foregrip segment is laterally offset from the longitudinal central axis of said rod shaft towards the opposite side of said reel seat segment from that on which the crank of a reel mounted on said reel seat will be located.

3. A fishing rod and handle assembly as defined in claims 1 or 2 wherein:
a fishing reel is mounted on said reel seat segment, said fishing reel being a bait-casting fishing reel having a line spool with a central axis extending parallel to said rod shaft axis and a crank for said spool mounted on one side thereof opposite from said laterally offset, palming grip side of said foregrip, and said reel spool and spool central axis being laterally offset from said palming grip side of said foregrip and from said rod shaft axis in a direction towards said crank.

4. A fishing rod and handle assembly as defined in claim 1 wherein:
said inclined surface is of curvilinear shape.

5. A bait-casting fishing reel comprising:
a reel body having a reel crank attached to one side of said reel body and a palming grip side wall on the opposite side thereof;
a reel spool positioned within said reel body and having side wall means at its opposite ends for containing fishing line, said reel spool having a central axis centered between said side wall means and extending generally perpendicular to the reel spool rotary axis;
a reel foot attachment bar attached to the bottom of said reel body, said reel foot attachment bar having a longitudinal central axis extending parallel to said central axis of said reel spool and being used to assemble said fishing reel to the reel seat segment of a fishing rod and handle assembly, said central axis of said reel foot attachment bar being laterally offset from said central axis of said reel spool in a direction opposite form said crank of said reel, and towards said palming grip side wall, whereby said reel spool side wall means on the palming grip side wall side of the reel is closer to said reel foot attachment bar than the other reel spool side wall means at the opposite end of the reel spool.

6. A fishing reel as defined in claim 5 wherein said fishing reel is assembled to a fishing rod and handle assembly comprising:
a rod shaft having a longitudinal central axis;
an elongated handle secured to said rod shaft;
a reel seat segment on said handle a reel seat thereon; and
a butt grip segment on the rear end of said handle behind said reel seat segment, said butt grip segment being laterally offset from the longitudinal central axis of said rod shaft, at least at a forward location on said butt grip segment behind said reel seat segment, towards said palming grip side wall.

7. A fishing reel as defined in claim 5 wherein:
said palming grip side wall is smoothly contoured and free of laterally outward projections of any kind on its outer, palming side surface and is positioned substantially closer to said handle in a lateral direction to thereby reduce palming grip distance from said palming grip side wall to the handle.

8. A fishing reel as defined in claim 5 wherein said fishing reel is assembled to a fishing rod and handle assembly comprising:
a rod shaft having a longitudinal central axis;
an elongated handle secured to said rod shaft;
a reel seat segment on said handle having a reel seat, said reel foot attachment bar being mounted on said reel seat; and
said central axis of said reel spool being laterally offset from said rod shaft central axis in a direction towards said reel crank.

9. A fishing reel as defined in claim 8 wherein said rod shaft extends within said reel seat segment of said handle.

10. A fishing rod and handle assembly comprising:
a rod shaft having a longitudinal, central axis;
a reel seat segment on said handle having a reel seat thereon;
an elongated handle secured to said rod shaft, said handle having a palming grip side on the side thereof opposite the side on which the crank of a reel mounted on said reel seat will be located; and
an upward force-resistant inclined surface extending along the top of at least a portion of said palming grip side of said handle, said inclined surface sloping downwardly and outwardly towards said palming grip side of the handle, whereby a relatively large part of the user's palm may be positioned on top of said inclined surface to effectively resist leveraged upward rod forces acting on said handle when gripping the handle in the palming position.

11. A fishing rod and handle assemble as defined in claim 10 wherein:

said inclined surface slopes downwardly and outwardly towards said palming grip side of the handle as viewed in a cross sectional plane extending generally perpendicular to said rod shaft axis.

12. A fishing rod and handle assembly as defined in claim 10 wherein:

said inclined surface merges along the lower edge thereof with the palming side wall of the handle, thereby creating a lateral projection on the palming side of the handle which projects into and bears against the palming hand of the user when grasping the handle with a palming grip.

13. A fishing rod and handle assembly as defined in claim 10 wherein:

the bottom portion of said handle in the area of said inclined surface is laterally wider than the top portion of the handle at the same location along the length of the handle, as viewed in a cross sectional plane extending generally perpendicular to said rod shaft axis.

14. A fishing rod and handle assembly as defined in claim 10 wherein:

said handle has a butt grip segment on the rear end thereof behind said reel seat segment, said butt grip segment being laterally offset from the longitudinal central axis of said rod shaft, at least at a forward location on said butt grip segment, towards said palming grip side of the handle.

15. A fishing rod and handle assembly as defined in claim 10 wherein:

said handle has a butt grip segment behind said reel seat segment, and at least a portion of said upward force-resistant inclined surface being on said butt grip segment.

16. A fishing rod and handle assembly as defined in claim 14 wherein:

said butt grip segment is of an inclined, pistol grip configuration with a rearward portion thereof offset downwardly from the longitudinal central axis of said rod shaft.

17. A fishing rod and handle assembly as defined in claim 15 wherein:

said rod shaft extends through said reel seat segment and into at least a forward portion of said butt grip segment.

18. A fishing rod and handle assembly as defined in claim 10 wherein:

a forward portion of said butt grip segment is offset upwardly from the longitudinal central axis of said rod shaft.

19. A fishing rod and handle assembly as defined in claim 15 wherein:

said butt grip segment has a forward portion behind said reel seat segment and a rearward portion, said forward portion of said butt grip being laterally narrower than said rearward portion, and said rearward portion of said butt grip being laterally offset from the central axis of said rod shaft in a direction towards the opposite side of said handle from said palming grip side thereof.

20. A fishing rod and handle assembly as defined in claim 10 wherein:

said rod shaft extends at least partially into said handle and said rod shaft is exposed to the user's hand grip along at least a portion of said inclined surface.

21. A fishing rod and handle assembly as defined in claim 10 wherein:

a fishing reel is mounted on said handle, said fishing reel being a bait-casting style fishing reel, said fishing reel having a reel crank on one side thereof located on the opposite side of said handle from said palming grip side of the handle.

22. A fishing rod and handle assembly as defined in claim 10 wherein:

a spinning-style fishing reel is attached to said rod and handle assembly.

23. A fishing rod and handle assembly as defined in claim 10 wherein:

said handle has a foregrip segment disposed forwardly of said reel seat segment, and at least a portion of said upward force-resistant inclined surface is on said foregrip segment.

24. A fishing rod and handle assembly as defined in claim 23 wherein:

at least a portion of said foregrip segment is laterally offset from the longitudinal central axis of said rod shaft in a direction towards said palming grip side of said handle.

25. A fishing rod and handle assembly as defined in claim 21 wherein:

said reel includes a spool containing fishing line, said spool having a central axis;

said reel further includes a reel foot attachment bar having a longitudinal central axis, said attachment bar being mounted on said reel seat, and said attachment bar being laterally offset from the central axis of the reel spool in a direction towards said palming grip side of said handle, and said reel spool central axis is laterally offset from the central axis of said rod shaft in a direction towards said reel crank.

26. A fishing rod and handle assembly comprising:

a rod shaft having a longitudinal central axis;

an elongated handle secured to said rod shaft;

a reel seat segment on said handle having a reel seat thereon;

a butt grip segment on said handle positioned behind said reel seat segment, said butt grip segment having a forward portion and a rearward portion, with the forward portion of the butt grip segment being laterally narrower than said rearward portion, and said rearward portion of said butt grip being laterally offset from the longitudinal central axis of said rod shaft in a direction towards the crank of a reel to be mounted on said reel seat segment.

27. A fishing rod and handle assembly as defined in claim 26 wherein:

at least a portion of said rearward portion of said butt grip segment is vertically offset downwardly from the longitudinal central axis of said rod shaft.

28. A fishing rod and handle assembly as defined in claim 26 wherein:

said rod shaft extends through said reel seat segment and at least partially into said butt grip segment of said handle.

29. A fishing rod and handle assembly as defined in claim 26 wherein:

said forward portion of said butt grip segment is laterally centered on said rod shaft axis.

* * * * *

UNITED STATES PATENT AND TRADEMARK OFFICE
CERTIFICATE OF CORRECTION

PATENT NO. : 4,817,324
DATED : April 4, 1989
INVENTOR(S) : John E. Brackett and Larry J. Dahlberg It is certified that error appears in the above-identified patent and that said Letters Patent is hereby corrected as shown below:

In Column 10, line 62, change "nd" to --and--

In Column 11, line 10, change "FIGS. and 8" to --FIGS. 1 and 8--

In Column 14, line 11, change "form" after opposite to --from--

Signed and Sealed this

Twenty-first Day of November, 1989

Attest:

JEFFREY M. SAMUELS

Attesting Officer     Acting Commissioner of Patents and Trademarks